(12) United States Patent
Yang

(10) Patent No.: US 6,694,062 B1
(45) Date of Patent: Feb. 17, 2004

(54) DEVICE AND METHOD OF CORRECTING DARK LINES OF A SCANNED IMAGE

(75) Inventor: Shu-Fen Yang, Hsinchu Hsien (TW)

(73) Assignee: Mustek Systems, Inc., Hsin-Chu (TW)

( * ) Notice: Subject to any disclaimer, the term of this patent is extended or adjusted under 35 U.S.C. 154(b) by 0 days.

(21) Appl. No.: 09/368,609

(22) Filed: Aug. 5, 1999

(30) Foreign Application Priority Data

Aug. 5, 1998 (TW) ........................................ 87112909 A

(51) Int. Cl.[7] ................................................ G03F 3/08
(52) U.S. Cl. ........................................ 382/275; 358/463
(58) Field of Search ................................ 382/260–275; 358/463, 3.26

(56) References Cited

U.S. PATENT DOCUMENTS 6,034,794 A * 3/2000 Suganuma ................. 358/518
6,398,334 B2 * 6/2002 Dunand ....................... 347/14
6,487,321 B1 * 11/2002 Edgar et al. ................ 382/260

* cited by examiner

Primary Examiner—Thomas D. Lee
Assistant Examiner—Stephen Brinich
(74) Attorney, Agent, or Firm—Ladas & Parry

(57) ABSTRACT

A device and method of correcting a scanned image generated by a scanner for eliminating dark lines. The scanner is driven to scan a calibration paper. Using the scan data, a plurality of base scan data corresponding to various positions of a scanning line are calculated by averaging the scan data at the same position. Further, a plurality of reference scan data corresponding to various positions of the scanning line are calculated in response to the base scan data with a numerical processing procedure, such as the left-/right-reference algorithm or the curve approximation algorithm. The difference between the base scan data and their corresponding reference scan data is compared with a defect level to mark the defect positions. Finally, the output of the scanned image sensed by the image scanner is corrected by using the defect information, thereby eliminating dark lines.

22 Claims, 11 Drawing Sheets

DEVICE AND METHOD OF CORRECTING DARK LINES OF A SCANNED IMAGE

BACKGROUND OF THE INVENTION

1. Field of the Invention

This invention relates to an image scanning technology, particularly to a device and method of correcting dark lines of a scanned image.

2. Description of the Related Art

Generally, less expensive charge couple devices (CCDs) or contact image sensors (CISs) are used in personal scanners to lower manufacturing cost. Therefore, their quality is not reliable. The CCDs in some units may fail after a period of use and lead to the "dark line phenomenon" in actual scanning practices. The so-called "dark lines" incurred in image scanning are the vertical lines, which normally are in black, but can also be in other colors. More precisely, a dark line represents a vertical line with a color being inconsistent with those of the neighboring pixels. The causes for dark lines in image scanning are specified with reference to FIG. 1 as follows.

FIG. 1 (Prior Art) is a simple diagram of a scanner. Normally, in a scanner with a CCD as a sensor component, the light will be first reflected by several reflective mirrors and refracted by lenses and then reach the CCD. The width of the CCDs is normally smaller than the scanning width due to light convergence of the lenses. In the figure, the reflective mirrors and the lenses are omitted since they are not the major concern of this invention. For the sake of convenience, the width of the CCD is set to be identical to the width of the scanned region. In FIG. 1, numeral 99 denotes a document to be scanned, 98 denotes a CCD (or CIS) scanning head. As shown in the figure, the CCD scanning head 98 is in a shape of a horizontal bar, and therefore, a bar region of the document 99 can be scanned in each scanning operation. When the CCD scanning head 98 moves downward in vertical direction, the bar regions are sequentially scanned and the document 99 can be scanned completely in such a way.

Assume that a part of the CCD scanning head 98 in FIG. 1 is damaged. For example, the CCDs P1, P2, and P3 are damaged. When the CCD scanning head 98 performs a downward scan, the scanning head 99 fails to correctly sense the part of the document that should be sensed by these damaged CCDs (P1, P2 and P3). In other words, the actual scanned data corresponding to these damaged CCDs are irrelevant to the content of the actual document. When the scanned image is directly outputted through the printer, three vertical dark lines will appear in the document. Moreover, defective pixels, such as P1, P2, and P3 of FIG. 1, result in the image dark lines.

The above description illustrates an example in which the cause for dark lines is the damaged or defective CCD components. In fact, there are other causes attributed to dark lines. For example, an obstacle in the scanning window or the optical path may also cause dark lines in the scanned image. In other words, such problem may still exist even if better CCD components are used to enhance the quality. Therefore, eradicating dark lines by correcting scanned image remains a critical issue in image processing.

SUMMARY OF THE INVENTION

Accordingly, the primary object of this invention is to provide a device and method of correcting a scanned image for eliminating the dark lines in the scanned image and recovering the actual image data in these dark lines.

According to the above object, this invention provides a method of correcting dark lines of a scanned image for correcting dark lines in a scanned image generated by an image scanner. The method comprises the following steps. First, the image scanner is driven to scan a reference document for producing a calibrated output. The reference document is a white clean calibration paper for searching the defect position that may cause dark lines. Next, a plurality of base scan data corresponding to pixel positions of the typical scanning line are generated by the aforementioned calibrated output. These base scan data can be obtained by averaging the scan data corresponding to the same pixel positions of the scanning lines of the reference document. Further, a plurality of reference scan data corresponding to the positions of the typical scanning line with aforementioned base scan data by using a numerical processing procedure, such as the left-/right-reference algorithm and the curve approximation algorithm. Next, a defect level is provided. Then the difference values between the base scan data and the corresponding reference scan data are compared with the defect level for indicating the defect positions on the typical scanning line. Finally, the scanned image generated by the same image scanner can be corrected in accordance with the indicated defect positions for eliminating the dark lines.

In addition, this invention also provides a device for correcting a scanned image outputted by the image scanner and for performing the dark line correction. The correction device comprises a base scan data calculation unit, a reference scan data calculation unit, a defect level unit, a defect marking unit and a correction unit. The base scan data calculation unit calculates a plurality of base scan data corresponding to pixel positions of the typical scanning lines according to the scan data generated by the image scanner scanning a reference document. For example, a scan is performed to a piece of white paper, and these base scan data corresponding to each pixel position of the typical scanning line is calculated by averaging the scan data at the same position of these scanning lines. Further, the reference scan data calculation unit calculates a plurality of reference scan data corresponding to the positions of the typical scanning line in accordance with the aforementioned base scan data and a numerical processing procedure. The numerical processing method can be the left-reference algorithm (performed by shifting the base scan data to the right), the right-reference algorithm (performed by shifting the base scan data to the left), or the curve approximation algorithm (performed by generate an approximate curve). Moreover, the defect level unit provides a defect level, which can be a fixed value, or a given varying value calculated from the reference scan data and the base scan data. The defect marking unit compares the difference between base scan data and reference scan with the defect level, and marks defect locations of the typical scanning line. Finally, the correction unit corrects the output of the scanned image generated by the same image scanner with the marked defect positions for eliminating dark lines.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THE PREFERRED EMBODIMENTS

Figure 1:
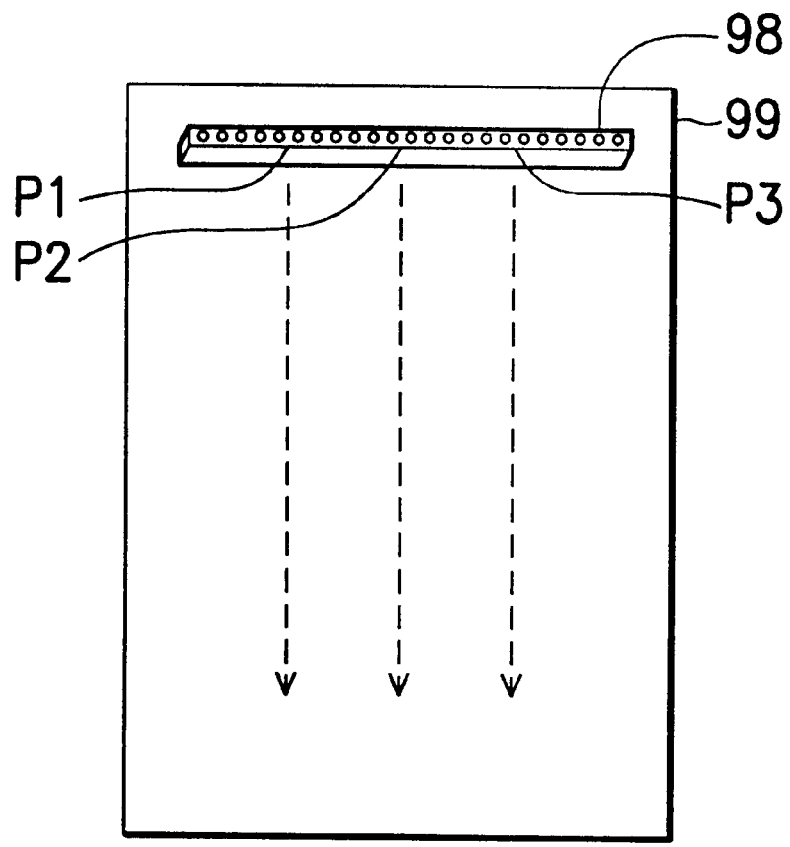
FIG. 1 (Prior Art) is a diagram of the scanner having inherent defective CCDs that can cause dark lines.
Figure 2:
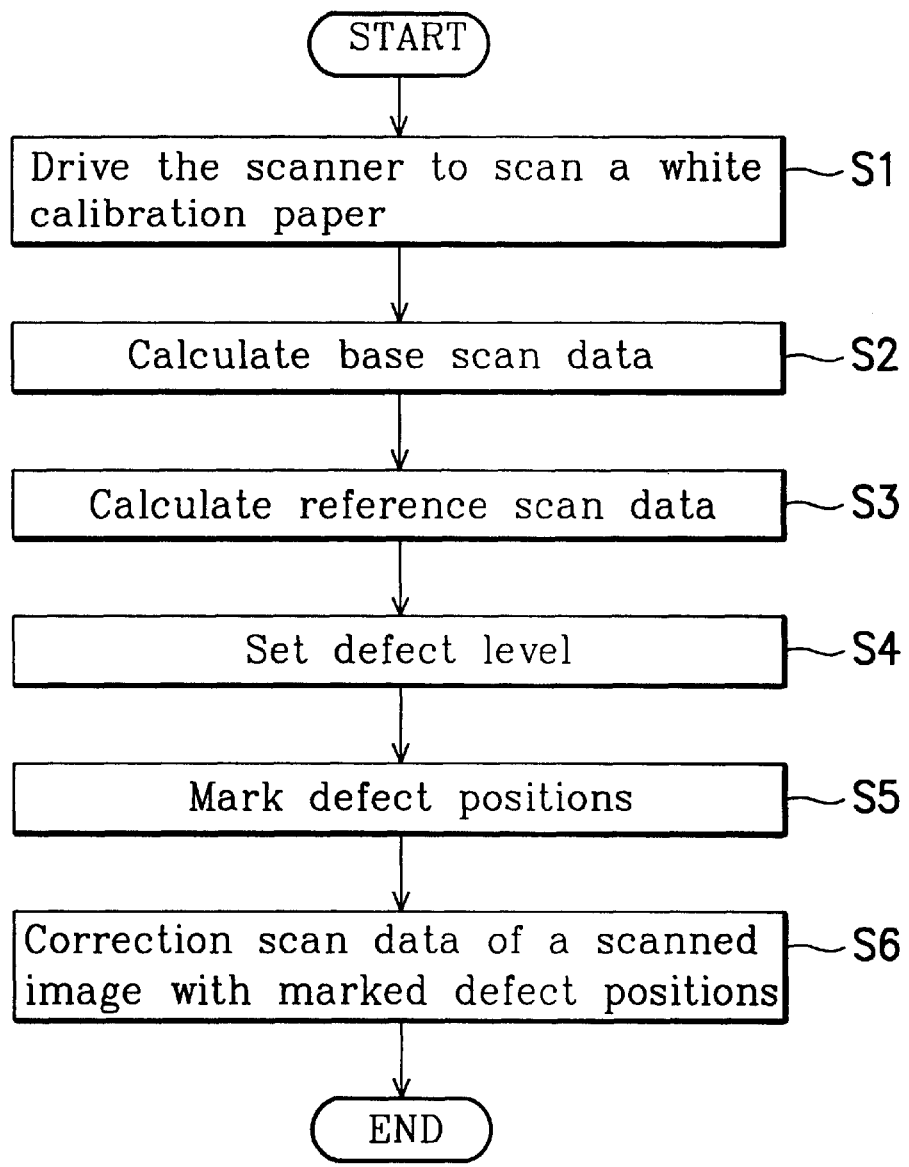
FIG. 2 is a flowchart illustrating the common procedure of the method of correcting dark lines in an image scanner.

The general method of correcting dark lines of the scanned image in the present invention is described. FIG. 2 illustrates the flowchart of the dark line correction method of this invention. Before performing dark line correction, potential defect positions of dark lines have to be located in advance in the current status of the scanner. Refer to FIG. 2, the scanner is driven to scan a white paper for calibration and generate a calibrated output (S1). The white calibration paper can clearly display the image effects caused by the dark lines. However, other colors of paper can also be used in practical applications. For example, in a color scanner, there are three data channels corresponding to three primary colors (red, blue, and green). Therefore, three calibration papers with different colors contrast to the primary colors can be used in this step, respectively. The image effects of various dark lines can clearly displayed. Further, this calibration paper also can be internally embedded in the scanner or provided externally.

Next, based on the calibrated output produced from sensing the calibrated paper, a plurality of base scan data corresponding to the pixel positions of the scanning lines are calculated (Step S2). In the embodiments, each of the base scan data, which corresponds to the same pixel position of the scanning lines, is obtained by averaging the scan data of the corresponding pixel positions in these scanning lines. These base scan data represent the average brightness values of the pixel positions in a scanning line. Generally, in a typical scanning line, its two ends appear to be darker, whereas the central part is brighter, the change in between is in continuum. Only defective locations have a abrupt change in brightness.

In addition, a plurality of reference scan data corresponding to the pixel positions of a typical scanning line are calculated by a predefined numerical processing procedure (S3). These reference scan data are used to compare with the base scan data to determine potential defective locations. In the following embodiment, three numerical processing procedures, including a left-reference algorithm, a right-reference algorithm and a curve approximation algorithm, will be illustrated. However, it is noted that other applicable numerical processing procedures can also be employed.

Next, a defect level is defined as a fixed value according to the status of the scanner, or determined by the acquired base scan data and reference scan data (S4).

The final step is to mark defect positions (S5). That is, the differences between the base scan data and the corresponding reference scan data in the same positions of the typical scanning line are compared with the defect level, respectively, to mark defect locations of the CCD sensors. In other words, when the difference exceeds the predetermined defect level, then the spot with abrupt change may correspond to a potential defect location.

Using the marked defective locations, the output data of the sensed image which original contains dark lines are modified to eliminate dark lines (S6).

Two embodiments will be described in detail in accordance with the processing procedures as shown in FIG. 2. Since the basic processing procedures of the two embodiments are similar to that shown in FIG. 2, except in partial implementation technology. In the first embodiment, the reference scan data are determined by the left-/right-reference algorithm and the defect level is a constant or fixed value. In the second embodiment, however, the reference scan data are determined by the curve approximation algorithm, and the defect level is dynamically set through the base scan data and the reference scan data. Although the two embodiments differ partially in technology, they are not meant to limit the application of a specific technology to a particular embodiment. The specific technology applied in a particular embodiment can be applied to another without departing from the scope and spirit of this invention. Also, in the embodiments the three primary colors (R, G and B) are default colors for color scanning of the scan data unless otherwise specified.

First Embodiment

In step S1 of FIG. 2, the scanner scans the white calibration paper to acquire a plurality of scanning line data. Next, in step S2, the base scan data are calculated with the obtained data of various scanning lines. In this embodiment, not all of the scanning line data obtained by scanning the white calibration paper are used to calculate the base scan data. In this embodiment, the scan line data obtained at initially scanning are not used and only the subsequent scan line data are taken for computation, thereby preventing from scanning marginal effects which may affect the accuracy of the base scan data. For example, in a scanned image with 300 scanning lines, the first 50 and last 50 scanning line data are ignored and only the middle 200 lines are used for computation.

Figure 3:
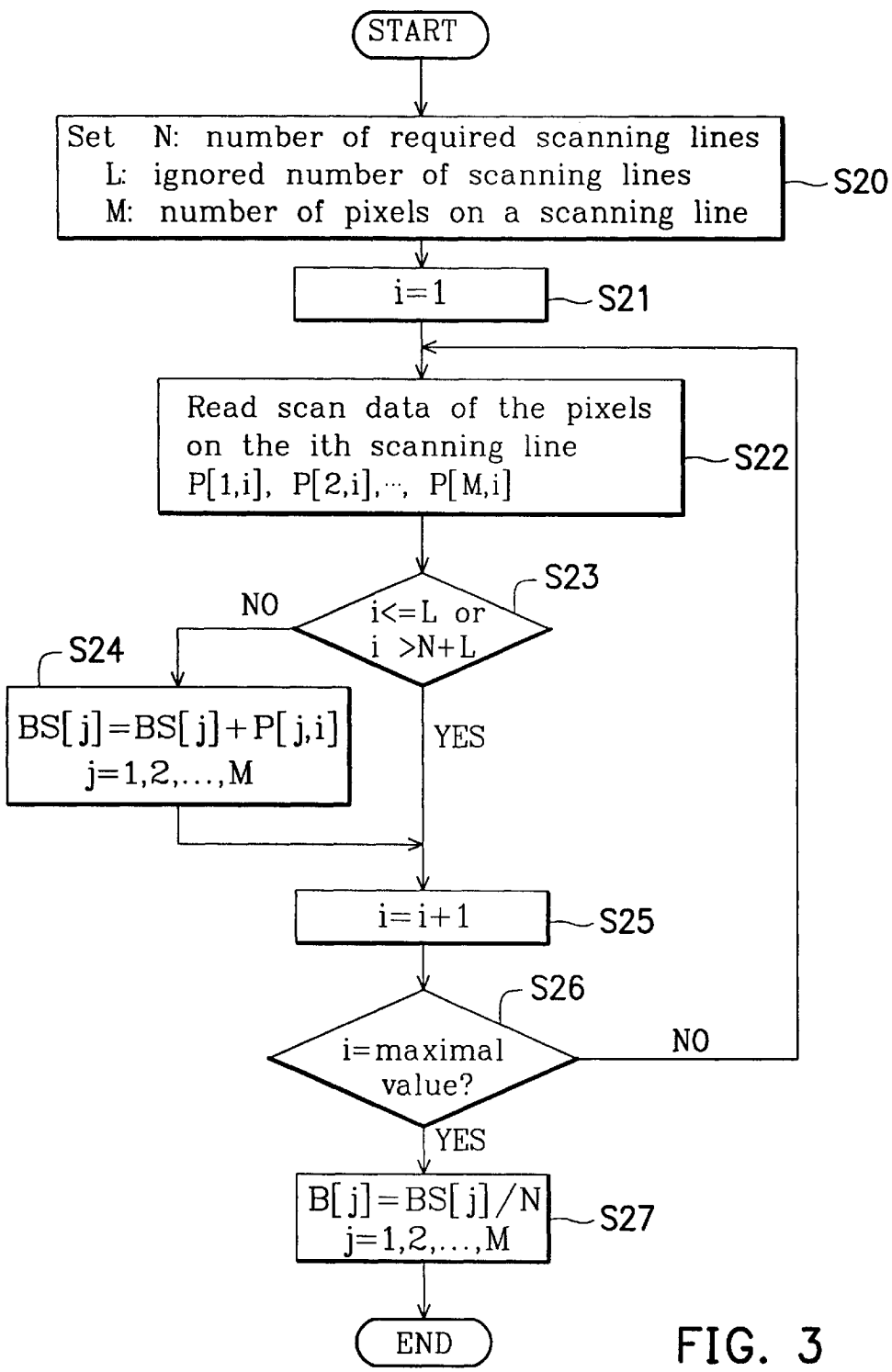
FIG. 3 is a detailed flowchart illustrating the steps of calculating the base scan data in the first embodiment.

FIG. 3 illustrates a detailed flowchart of calculating the base scan data in this embodiment. As shown, N is the number of acquired scanning lines and L represents the number of the scanning line to be ignored. M is the number of pixels in each scanning line (S20). Next, variable i is set as 1 (S21) for indicating the processing of the various scanning line data produced in scanning the calibration paper.

Next, the pixel data of the scanning line corresponding to the variable i are read and denoted by P[1,i], P[2,i], . . . , and P[M,i], respectively (S22). If this scanning line does not belong to the desired scanning lines or does satisfy the following condition (S23):

$$i \leq L \text{ or } i > N+L \quad (1),$$

the pixel data of this scanning line are withdrawn. The variable i is incremented (S25) and it is determined whether i has reached the maximal value (S26). If not, then return to step S22 for processing the data of the next scanning line. If the variable i does not satisfy the condition, then it means that the current scanning line is within the desired range, and the corresponding pixel data of various positions are accumulated (S24) to obtain the accumulated value of various positions BS[j], as shown in equation (2):

$$BS[j] = BS[j] + P[j, i] \quad j = 1, 2, \ldots, M \quad (2)$$

Then, the variable i is incremented (S25), and it is determined whether i has reached the maximal value (S26) If not, then return to step S22 to continue the processing of the next scanning line.

The above loop ends when the variable i has reached its maximal value. At this time, the accumulated values in different pixel positions are divided by N, respectively, so the base scan data B[j] corresponding to each position of the scanning line are obtained, as shown in equation (3):

$$B[j] = BS[j]/N \quad j = 1, 2, \ldots, M \quad (3)$$

Therefore, the base scan data B[.] can be obtained through the processing shown in FIG. 3, wherein [.] represents the corresponding position indexes in the scanning line.

Next, the reference scan data are calculated in accordance with the base scan data B[.] in step S3. In this embodiment, the reference scan data are calculated based upon the left or right-reference algorithm. In the left-/right-reference algorithm, the reference scan data in a specific pixel position is determined by the base scan data in a pixel position left or right to the specific pixel position by a certain number of pixels. The reference scan data R[.] can be represented in equation (4) when it is determined by the base scan data spaced by one pixel in the left side:

$$R[1] = B[1] \quad (4)$$
$$R[i] = B[i-1] \quad i = 1, 2, \ldots, M$$

In the left-reference algorithm, therefore, the reference scan data R[.] can be produced by right-shifting the base scan data B[.].

Also, the reference scan data R[.] can be represented in equation (5) when it is determined by the base scan data spaced by one pixel in the right side:

$$R[i] = B[i+1] \quad i = 1, 2, \ldots, M-1 \quad (5)$$
$$R[M] = B[M]$$

Hence, in the right-reference algorithm, the reference scan data R[.] are yielded by left-shifting the base scan data B[.].

Figure 4:
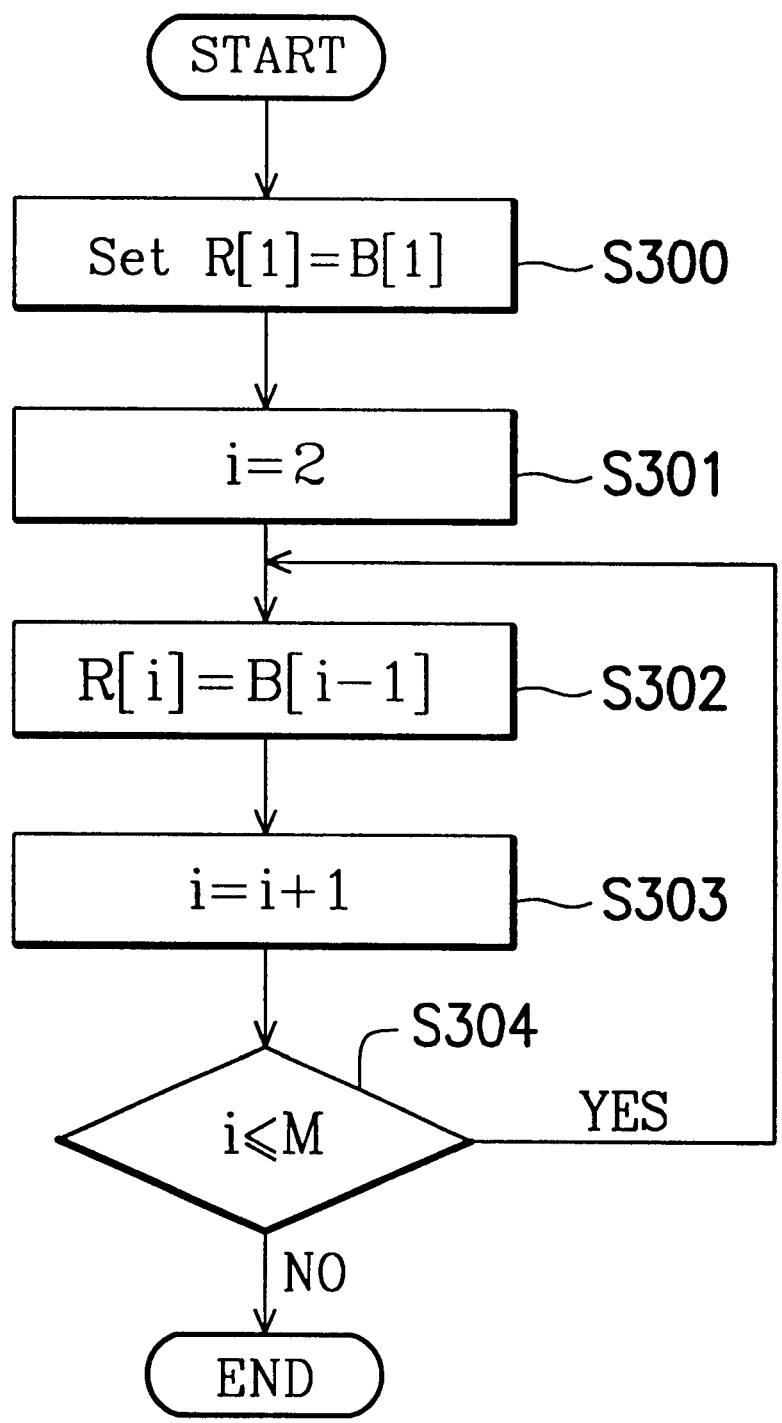
FIG. 4 is a detailed flowchart illustrating the steps of calculating the reference scan data in the first embodiment.

FIG. 4 is a detailed flowchart for illustrating the left-reference algorithm applied in step S3. First, the reference scan data corresponding to the first pixel is set as the base scan data in the same position; that is, R[1]=B[1] (S300). Next, the variable i is incremented for sequentially process-ing other reference scan data corresponding to remaining pixels (S301). Then, the other reference scan data corresponding to the remaining pixels are sequentially set by equation (4), R[i]=B[i−1] (S302) and the variable i is incremented during the recursive processing (S303). The termination condition is i≦M (S304), which means that all reference scan data have been processed.

Therefore, these reference scan data can be obtained through the base scan data with the processing procedure of equation (4). Also, the right-reference algorithm using equation (5) can also be exercised in similar manner. In the above description, only the left-/right-reference algorithm using one-pixel shifting is required for processing the single-defect case. However, a more complicated rule, such as left-/right-reference algorithm using more shifting positions or the curve approximation algorithm as specified in the second embodiment, is needed for determining in the case of continuous defect positions. For example, the left-/right-reference algorithm using a two-pixel shifting position can be used in the case with two continuous defective positions. For the sake of convenience, the left-reference algorithm using one-pixel shifting is employed in the following description unless otherwise specified.

Figure 5:
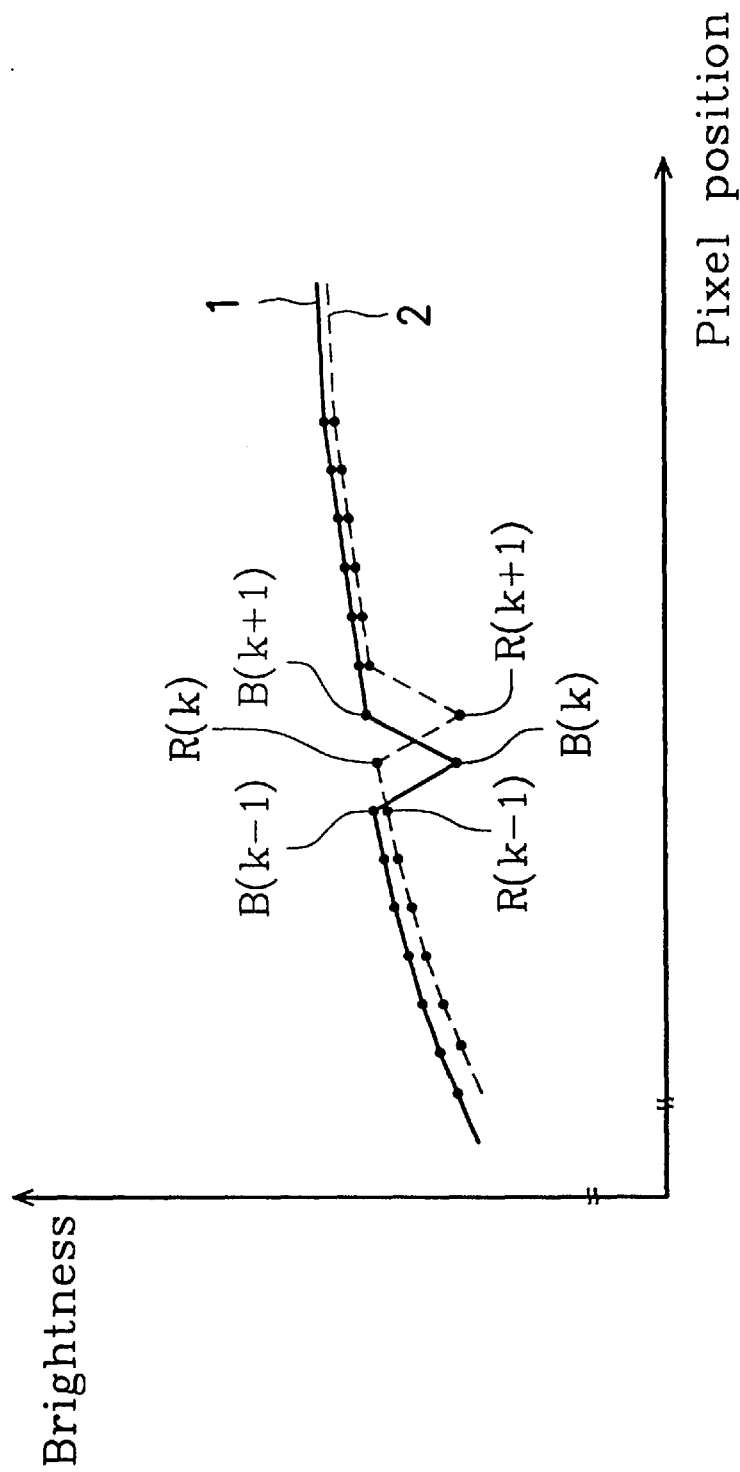
FIG. 5 is a diagram illustrating the relation between base scan data and corresponding reference scan data for determining the reference scan data with the left-reference algorithm.

FIG. 5 illustrates the relation between base scan data B[.] and the corresponding reference scan data R[.] for determining the reference scan data with the left-reference algorithm, as shown in FIG. 4. In FIG. 5, the x-axis represents the pixel position and the y-axis represents the brightness value of the corresponding pixel. In addition, numeral 1 is a curve formed by the base scan data B[.] and 2 a curve formed by the reference scan data R[.]. It can be clearly observed from the curve 1 that there is a defect at the k-th item of the base scan data B[k]; that is, its brightness is significantly lower than those of the surrounding positions. Also, the difference between the reference scan data R[k] and the base scan data B[k] is significant; therefore, it can be used for determining the location or position of the defect.

There are two things worth mentioning in FIG. 5. First, as stated above, various positions in the scanning line are different in brightness. Generally, the central part is brighter, while the two ends are darker. This variation is displayed in continuum. Since the resolution of the object to be scanned corresponding to the CCD is generally at least more than 300 DPI (dot per inch), therefore, the difference of the brightness value between adjoining pixel locations is normally not significant. Consequently, appropriate defect levels can be set to separate defect positions (k) from normal positions (k−1). In this embodiment, the defect position is set as a constant or a fixed value in step S4 and can be set according to the features of the device or other factors, such as the sensible variation of human eyes to various colors (corresponding to the scan data channel of various primary colors) and the features of CCD (or CIS) components of the scanner. Furthermore, various defect levels can be set respectively for the data channels pertaining to the three primary colors.

Second, the position (k+1) as shown in FIG. 5 is not really a defective pixel, but the value difference between B[k+1] and R[k+1] is significant. However, the circumstances with position k and position k+1 are still different. B[k] is smaller than R[k] at position k,; whereas B[K+1] is larger than R[k+1] at position k+1. So, the defect can be precisely detected with this relation. But the brightness value on the defect position has to be assumed lower than the normal (default) value for determining with this relation, as shown in FIG. 5. Or the brightness value on the defect positions is lower than the normal (default) value. Since in this embodiment the white calibration paper is used for scanning, the above assumptions (lower than the default or normal value) can be established in most cases. Hence, defect positions can be detected with the use of the inequality of R[k]−B[k]>defect level.

Figure 6:
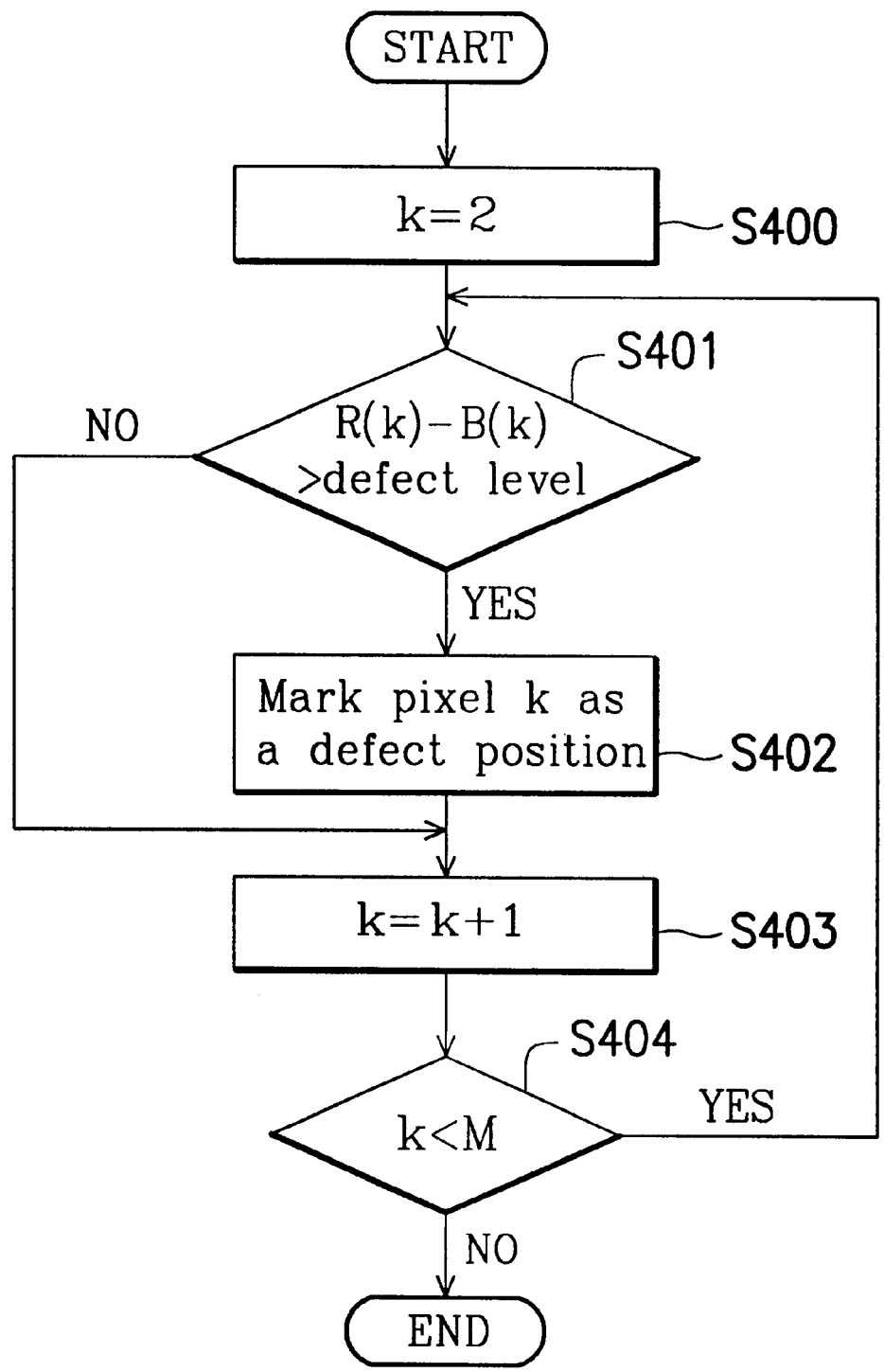
FIG. 6 is a detailed flowchart illustrating the steps of marking defect positions in the first embodiment.

As described above, defect positions can be indicated or marked with the base scan data B[.], the reference scan data R[.] and the defect level. FIG. 6 is a flowchart illustrating the detailed steps of marking defect positions in this embodiment. First, set the variable k to 2 (S400), that is, which means that checking defect positions starts from the second position of the scanning line. Next, in accordance with R[k]−B[k]>the defect level, determine whether the current position is a defect position (S401). When this inequality is not satisfied, then the current position is not a defect position, so no extra processing is necessary; when this inequality is satisfied, then the current position is a defect position, so the pixel k is indicated as a defect position (S402). After the variable k is accrued (S403), it is then determined whether i<M is satisfied (S404), that is, it is determined whether all reference scan data other than the start and end positions have been processed. If not, then return to step S401 for further processing; if yes, then end this processing procedure.

When step S5 ends, defect positions in pre-scan status are known. Next in step S6, the output of a scanned image is obtained from scanning an actual document with the marked defect positions. The following paragraphs describe how to use defect positions to correct the data obtained from scanning. The following description specifies the use of scanned data channels of the three primary colors.

Normally, defects are found only in a single-colored channel and are seldom found in the three channels at the same pixel. The correction of the scan data on a particular pixel position can be made for the channel with defects. The simplest way of acquiring an estimation value of the defect channel is to use linear interpolation based upon the data of adjacent normal pixels. Further, other normal scan channels on the defect position also need to be adjusted to eliminate the color difference induced by adjusting the scan data of the detective channel. Adjustment can be achieved by averaging the estimation value and the normal scan data on the related channels. The correction will now be specified with an embodiment as follows.

First assume that the various pixel data on a particular scanning line for a scanned document are $PN_1$, $PN_2$, . . . , $PN_M$ and the scan data on the color channels (red, blue, and green) of a pixel ($PN_t$) are $R_t$, $B_t$, and $G_t$, respectively, where the subscript represents the position information on a scanning line. Further, assume the defect positions marked by using the correction paper are i, j, k and k+1, and their data channels with defects are green, blue, green, and red, respectively, where k and k+1 are adjacent defect positions. The method of correction for respective defect position is described as follows.

The correction of the defect position i with a green defective channel is made by:

$Rnew_i=(R_i+(R_{i-1}+R_{i+1})/2)/2$ $Gnew_i=(G_{i-1}+G_{i+1})/2$ $Bnew_i=(B_i+(B_{i-1}+B_{i+1})/2)/2$ (6)

The correction of the defect position j with a blue defective channel is made by:

$Rnew_j=(R_j+(R_{j-1}+R_{j+1})/2)/2$ $Gnew_j=(G_j+(G_{j-1}+G_{j+1})/2)/2$ $Bnew_j=(B_{j-1}+B_{j+1})/2$ (7)

The correction of the defect position k with a green defective channel is made by:

$Rnew_k=(R_k+(R_{k-1}\times 2+R_{k+2})/3)/2$ $Gnew_k=(G_{k-1}\times 2+G_{k+2})/3$ $Bnew_k=(B_k+(B_{k-1}\times 2+B_{k+2})/3)/2$ (8)

The correction of the defect position k+1 (defect channel is red):

$Rnew_k=(R_{k-1}+R_{k+2}\times 2)3$ $Gnew_k=(G_{k+1}+(G_{k-1}+G_{k+2}\times 2)/3)/2$ $Bnew_k=(B_{k+1}+(B_{k-1}+B_{k+2}\times 2)/3)/2$ (9)

The above corrections can be represented with equations (10)–(12). Assume $PN_i$ (R, G, and B) is a defect position and there are n subsequent defect positions, that is, $PN_i$, $PN_{i+1}$, $PN_{i+2}$, . . . , $PN_{i+n-2}$, $PN_{i+n-1}$ are defect positions. Then the correction of these defect points can be represented with equations (10)–(12) as follows, where j=i, i+1, . . . , i+n−1:

$$Rnew_j = \begin{cases} (R_{i-1} \times (n+i-j) + R_{i+n} \times (j-i+1))/(n+1) \\ (R_j + (R_{i-1} \times (n+i-j) + R_{i+n} \times (j-i+1))/(n+1))/2 \end{cases} \quad (10)$$

$$Gnew_j = \begin{cases} (G_{i-1} \times (n+i-j) + G_{i+n} \times (j-i+1))/(n+1) \\ (G_j + (G_{i-1} \times (n+i-j) + G_{i+n} \times (j-i+1))/(n+1))/2 \end{cases} \quad (11)$$

$$Bnew_j = \begin{cases} (B_{i-1} \times (n+i-j) + B_{i+n} \times (j-i+1))/(n+1) \\ (B_j + (B_{i-1} \times (n+i-j) + B_{i+n} \times (j-i+1))/(n+1))/2 \end{cases} \quad (12)$$

The upper part of each equation denotes the calculation pertaining to the case that a defect point is present on the corresponding data channels, whereas the lower part denotes the calculation pertaining to other cases. The object of this invention can be achieved with the above equations by correcting all defect positions of single defects or continuous defects. One thing needs to be specified, although the method of adjusting defect positions and other normal scan data channels as described above simply averages out the estimates obtained with bilateral linear interpolation and the original data, other added methods actually are also applicable.

Second Embodiment

The procedure for correcting dark lines of a scanned image of FIG. 2 is also used in the second embodiment, only a part of the implementation procedure is different from that of the first embodiment. Wherein, the two embodiments are the same in implementing steps S1, S2 and S6 in FIG. 2, therefore the description related to these step is omitted. Distinct steps, namely, steps S3, S4, and S6, are described as follows.

In the second embodiment, the reference scan data R[.] are calculated with the curve approximation algorithm in step S3 after the base scan data B[.] has been acquired in step S2. The curve approximation algorithm uses an analytic curve to approximate the aforementioned base scan data, thereby obtaining the reference scan data on the corresponding positions. In other words, the analytic curve, which is approximate to a main curve formed with the base scan data by removing the base scan data of the defect position pertaining to an abrupt change, is employed to calculate the reference scan data. Then defect positions are determined by comparing the base scan data with the reference scan data.

Calculation of the reference scan data with the curve approximation algorithm, though requires hefty computation processes, offers two advantages. First, defect positions in which the scan data are lower or higher than the surrounding scan data can be accurately detected. Second, it is easy to process in terms of continuous defects.

Computing the reference scan data in step S3 is described in detail with reference to the drawings. It is noted that a quadratic curve (namely, $ax^2+bx+c$) is used for approximating various base scan data in this embodiment since the computation load for the quadratic curve is much less than that of other polynomial curves. Since the variation of the brightness at both ends of the lamp tube in the scanner is more remarkable (the brightness declines rapidly), whereas the brightness demonstrated with a quadratic curve is more restrictive, such a problem is overcome in this embodiment with segmentation. That is, the entire base scan data are segmented into several blocks for calculating their respective reference scan data, and the data volume of each segmented block of the base scan data may vary. For example, more blocks can be segmented on the condensed section of the base scan data corresponding to both ends of the lamp tube to comply with the variation of brightness at both ends of the lamp tube of the scanner.

Figure 7:
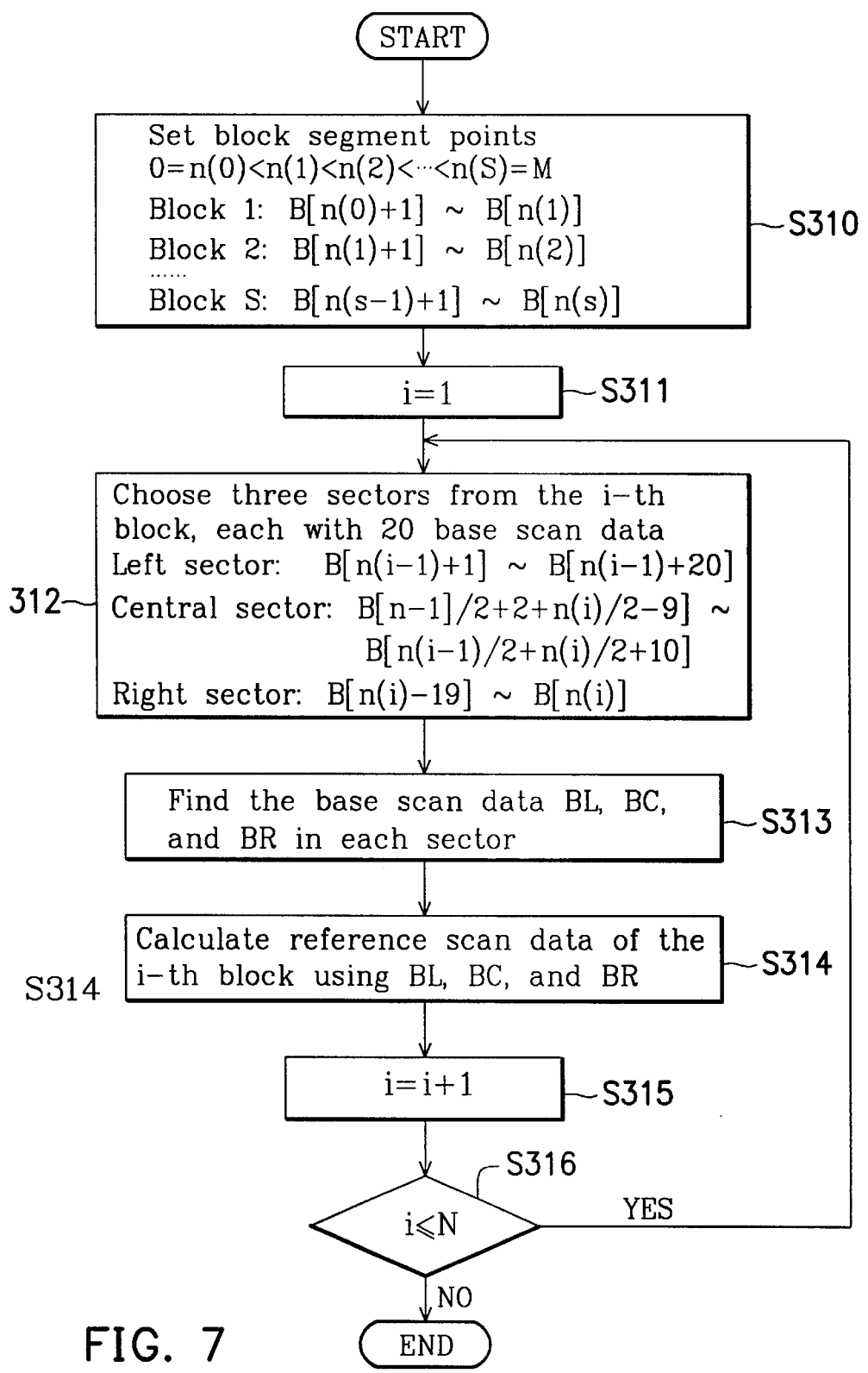
FIG. 7 is a detailed flowchart illustrating the steps of calculating the reference scan data in the second embodiment.

FIG. 7 is a detailed flowchart illustrating the process of calculating the reference scan data in step S3 of this embodiment. First, block section points of the base scan data are set (S310), namely, $0=n(0)<n(1)<n(2)<\ldots<n(S)=M$, where the base scan data B[.] of each block can be represented as:

Block 1: $B[n(0)+1]\sim B[n(1)]$

Block 2: $B[n(1)+1]\sim B[n(2)]$

. . . .

Block S: $B[n(s-1)+1]\sim B[n(s)]$

Where S denotes the number of blocks.

Next, the variable i is set to 1, for sequentially processing each block (S311). Further, three sectors, each of which contains 20 pixels, are chosen from the first block (S312), namely, the left sector, the central sector, and the right sector. In this embodiment, the base scan data B[.] contained in each sector can be represented as:

Left sector:

$B[n(i-1)+1]\sim B[n(i-1)+20]$

Central sector:

$B[n-1]/2+2+n(i)/2-9]\sim B[n(i-1)/2+n(i)/2+10]$

Right sector:

$B[n(i)-19]\sim B[n(i)]$

It is noted that the number of sectors in each block should be adjusted to comply with a different situation when a polynomial curve with higher degree is chosen for approximation. The number of the base scan data in each sector can be selectively adjusted, even overlapping is allowed for the base scan data in each sector in narrower blocks.

Next, the most approximate base scan data BL, BC and BR in each sector, which are the base scan data most approximate to the average value of the base scan data in the corresponding sector, are detected (S313), respectively. The average value of the 20 pieces of the base scan data in each sector is calculated first and then the average value is compared with the 20 pieces of the base scan data to find out the most approximate base scan data and their corresponding pixel positions. Finally, the reference scan data of the first block are calculated by using BL, BC, and BR and their corresponding pixel positions l, c, and r (S314). The variable i is incremented after the calculations are completed (S315) and step S312 is recursively performed until the computation of all blocks are finished (S316).

Figure 8:
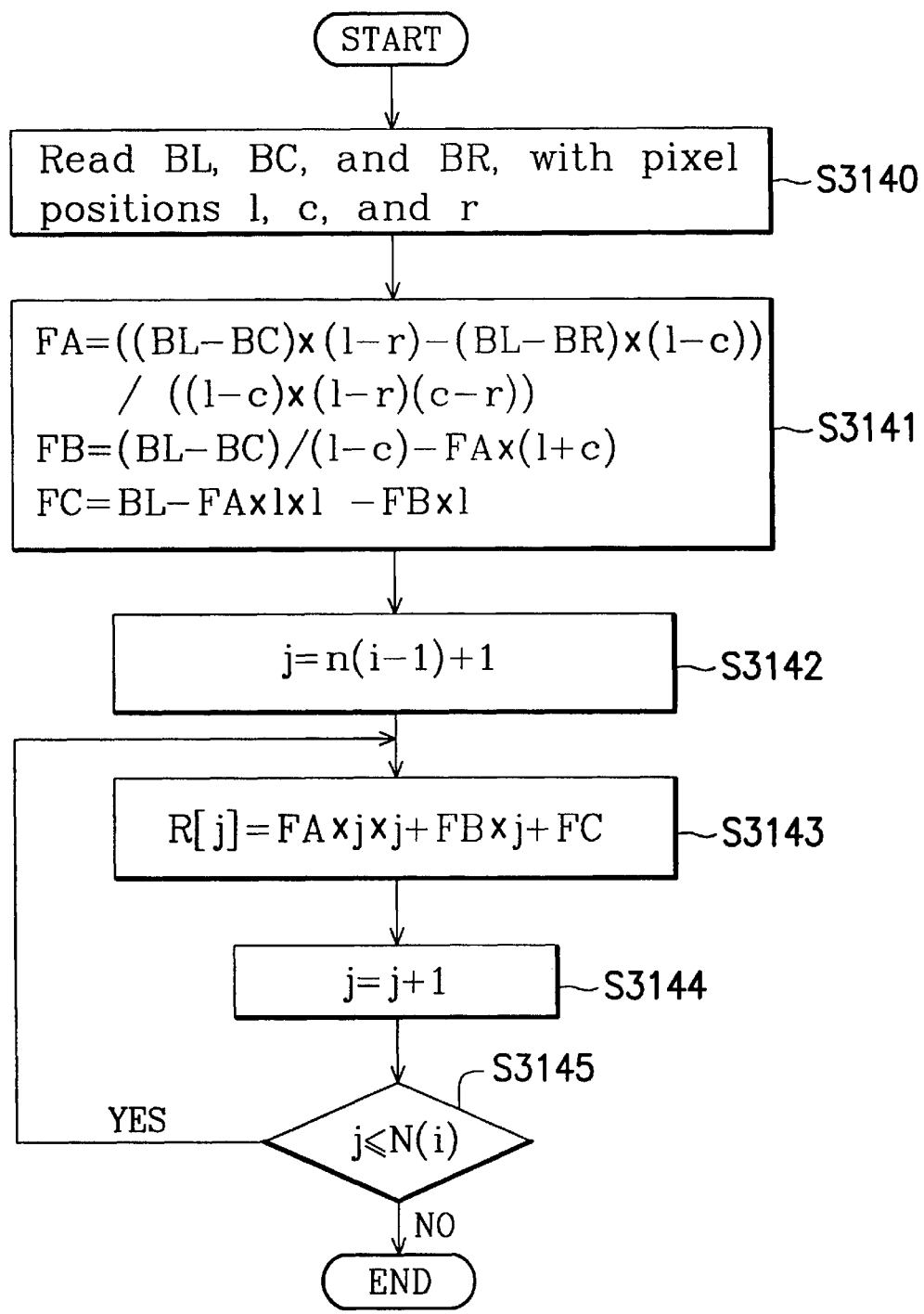
FIG. 8 is a detailed flowchart illustrating the steps of calculating the reference scan data of the i-th block in FIG. 7.

FIG. 8 is a detailed flowchart illustrating the detailed steps of calculating the reference scan data of the i-th block in step S314. First, the most approximate base scan data BL, BC and BR in the three sectors of the i-th block and their pixel positions l, c and r are provided (S3140). Next, the coefficients of a quadratic curve are determined by the following equations (13)–(15) using the above provided values, where FA, FB and FC are the coefficients of the quadratic curve.

$$FA = \frac{(BL-BC)\times(l-r)-(BL-BR)\times(l-c)}{(l-c)\times(l-r)\times(c-r)} \quad (13)$$

$$FB = \frac{BL-BC}{l-c} - FA\times(l+c) \quad (14)$$

$$FC = BL - FA\times l\times l - FB\times l \quad (15)$$

Next, set variable j as the starting pixel position of the i-th block, that is, $n(i-1)+1$, for sequentially calculating the reference scan data R[.] of various positions (S3142). The reference scan data R[j] in the j-th pixel position can be calculated with pixel position j, and the coefficients obtained with equations (13)–(15) according to equation (16) as follows (S3143).

$$R[j] = FA\times j\times j + FB\times j + FC \quad (16)$$

When the variable j is incremented (Step S3144), it is determined whether it exceeds the final pixel position n(I) of the i-th block (Step S3145). When the computation pertaining to all positions is completed, the processes of FIG. 7 are resumed to process other blocks.

Figure 9:
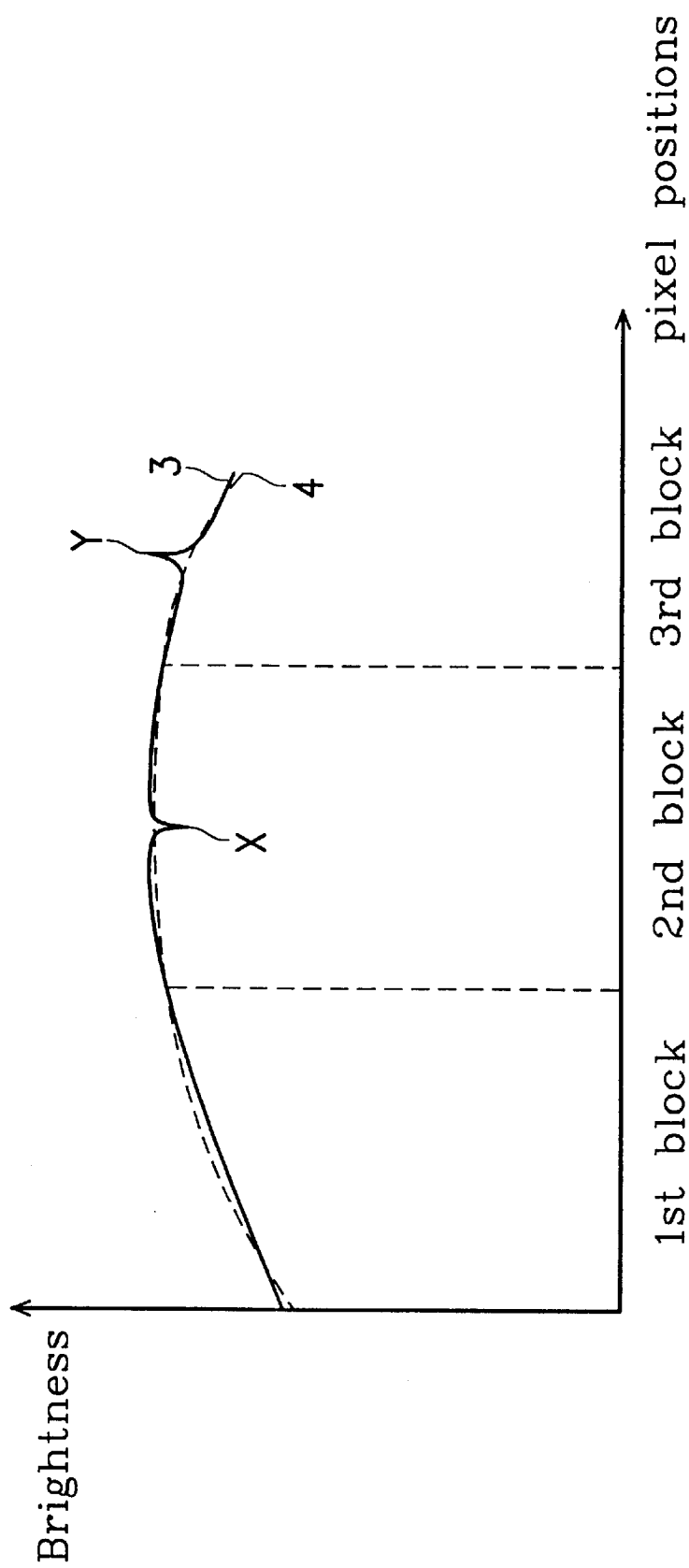
FIG. 9 is a diagram illustrating the relation between the base scan data and the corresponding reference scan data for determining the reference scan data with the curve approximation algorithm.

FIG. 9 is a diagram illustrating the relation between the base scan data and the corresponding reference scan data when determining the reference scan data with the curve approximation algorithm. In the figure, the curve approximation algorithm is achieved by segmenting the scanning line into three blocks, where numeral 3 denotes a curve representing the base scan data and numeral 4 denotes a curve representing the reference scan data. As shown in the figure, curve 4 is very close to curve 3, except for the defect positions X and Y. Therefore, the defect positions can be located by comparing the two curves. Also, as shown in FIG. 9, the values of the variation at points X and Y are in different directions but can be easily detected in this embodiment. Continuous defect positions can also be directly detected by curve approximation.

Next, in the step S4 of this embodiment for setting the defect level, the defect level is dynamically determined with the base scan data B[.] and the reference scan data R[.]. In the first embodiment, the defect level is set as a constant. Though it has the advantage of eliminating extra computations, some factors affecting the determination of defect positions may be ignored in practical processing, such as the individual properties of the CCDs in the same scanner sensor device. In this embodiment, however, the defect level is dynamically set to meet practical requirements based upon the scan data. The method of determining the defect level in this embodiment will be illustrated with a preferred example as follows.

The defect level is dynamically set by the root-mean-square value of the difference values between the base scan data and the reference scan data and the root-mean-square value of the absolute values of the maximal 20 difference values. Detailed processes are as follows. First, the difference value at each pixel position D, is obtained by:

$$D_i = B[i] - R[i] \quad i = 1, \ldots, M \quad (17)$$

Next, the root-mean-square value Da of these difference values $D_i$ is obtained by:

$$Da = \sqrt{\frac{D_1^2 + D_2^2 + D_3^2 + \ldots + D_M^2}{M}} \quad (18)$$

Assume the maximal 20 absolute values of the difference values $D_i$ are $T_1, T_2, \ldots, T_{20}$. The root-mean-square value Ta of these maximal difference values is obtained by:

$$Ta = \sqrt{\frac{T_1^2 + T_2^2 + T_3^2 + \ldots + T_{20}^2}{20}} \quad (19)$$

Finally, the defect value is set to the average value of the two RMS values, that is, (Da+Ta)/2.

There are three things worth mentioning regarding the calculation of the dynamic defect level:

(1) The reason of using the maximal 20 difference values in the aforementioned computation process is based on experiments, which demonstrate that very good detection results can be obtained in most cases. However, it is noted that this assumption should not be deemed to restrict the scope of this invention and other computation methods may also be applicable according to practical situations;

(2) (Da+Ta)/2 is one of possible the weighted values between Da and Ta. In practice, it can be varied from (0×Da+1.0×Ta) to (1.0×Da+0×Ta). Generally speaking, when the Da value is too low, the Ta value should be given a higher weight to prevent from serious detection mistakes resulted from the low defect level; and (3) The values of Da and Ta as mentioned above are all obtained by the RMS operations. However, other averaging techniques that are related to the distribution of a plurality of numerical values can also be employed in this embodiment.

Figure 10:
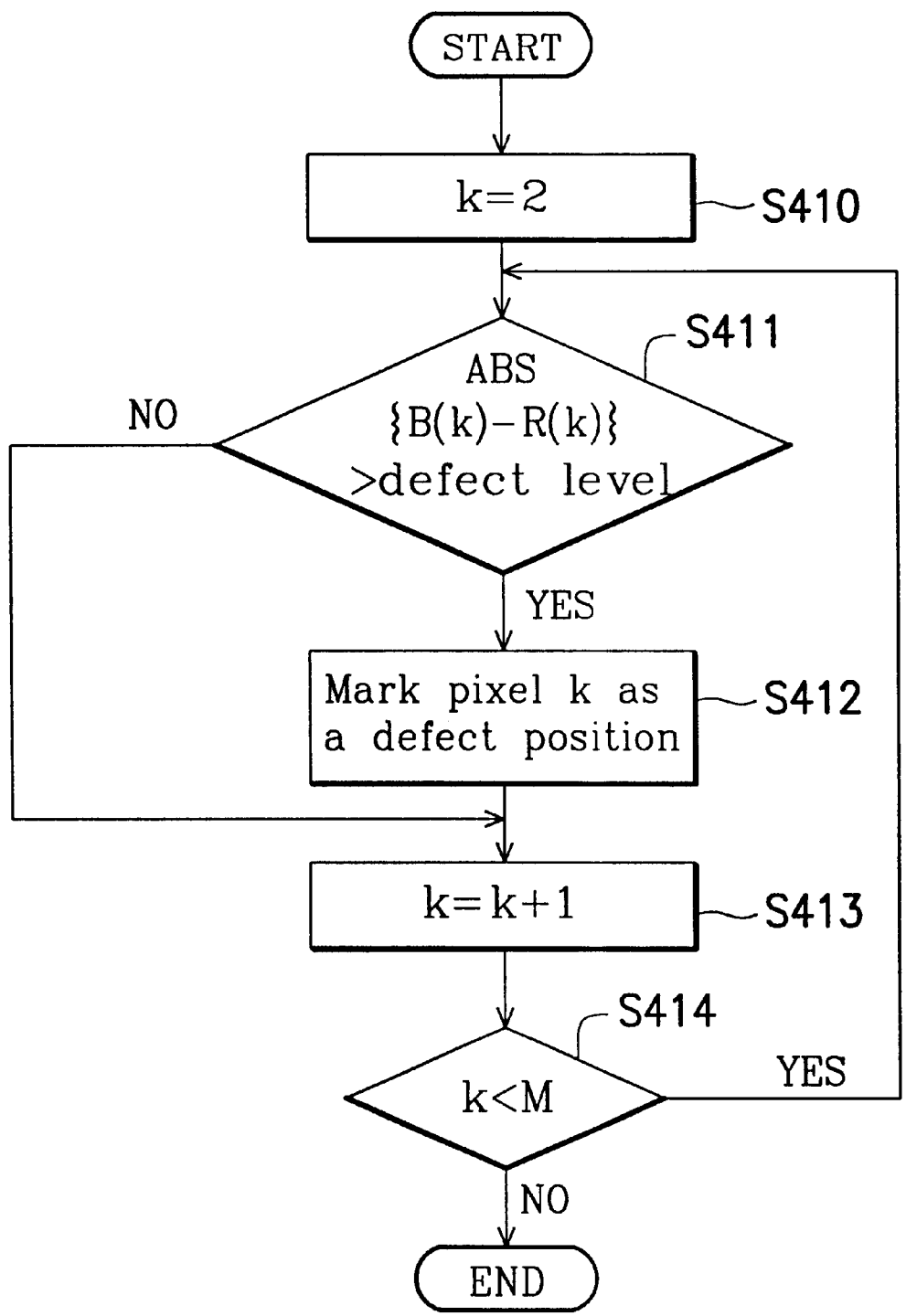
FIG. 10 is a detailed flowchart illustrating the steps of marking defect positions in the second embodiment.

Defect positions can be located based upon the base scan data B[.], the reference scan data R[.] and the defect level. FIG. 10 is a detailed flowchart illustrating the detailed steps of locating defect positions in step S5 of this embodiment. First, set the variable k to 2 (Step S410), which means that checking defect positions starts from the second pixel position of the scanning line. Next, determine whether current pixel position is a defect position in accordance with ABS (R[k]−B[k])>defect level, where ABS(.) is an absolute function. As described earlier, the reference scan data can be obtained with curve approximation for determining the defect positions with different varying properties. Whenever the difference exceeds the preset defect level, the defect position is identified.

Therefore, if the inequality is not satisfied, it means that the current position is not a defect position. If the inequality is satisfied, it means that the current position is a defect position and the pixel k is marked as a defect position (S412). After the variable k is incremented (S413), it is determined whether k<M is satisfied (S414), that is, it is determined whether the reference scan data of all positions other than the start and the end positions have been processed. If the processing is not yet finished, then return to step S411; if finished, then end this processing procedure.

After these defect positions are located, the correction method as specified in the first embodiment can be used to correct all positions and data channels with defects.

Figure 11:
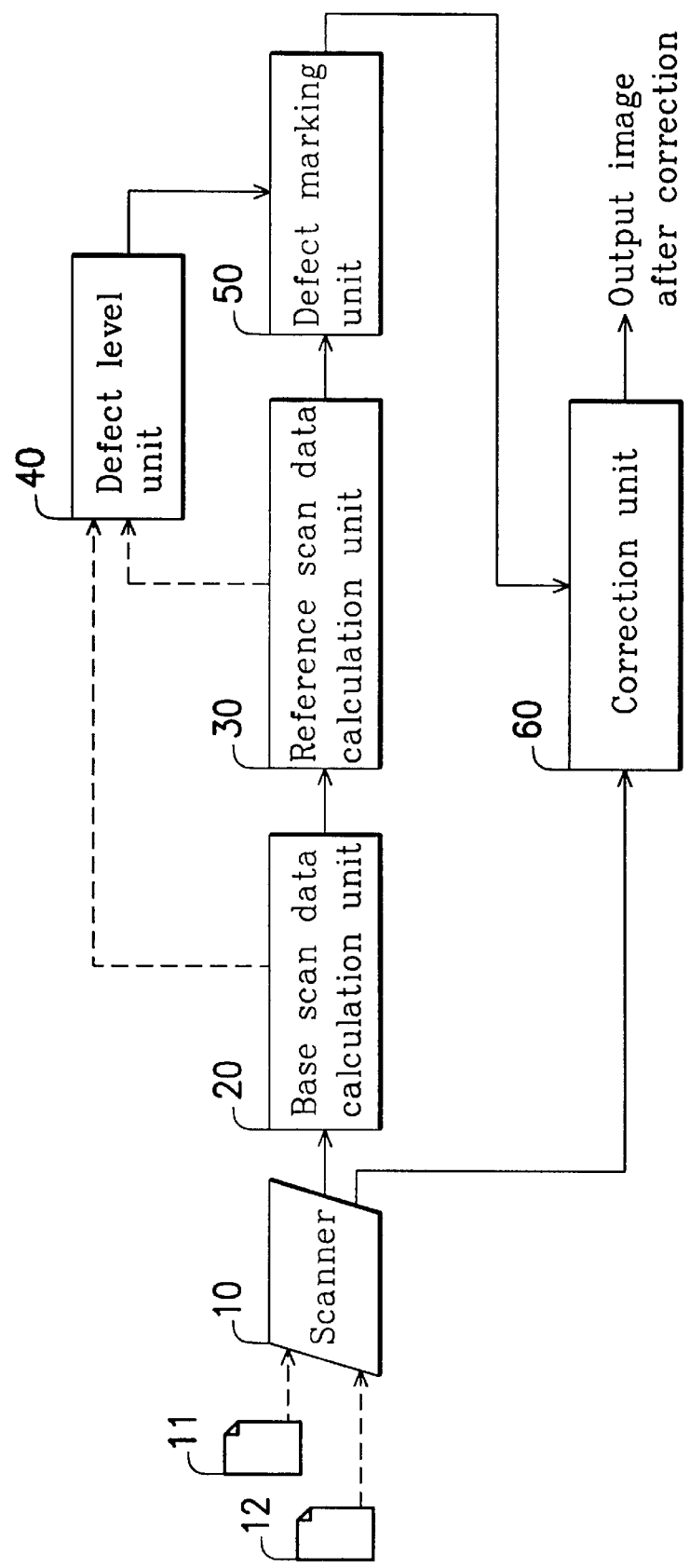
FIG. 11 is a block diagram of the dark line correction device in accordance with this invention.

The dark line correction method as specified above can be realized not only by software but also by hardware. FIG. 11 is a block diagram of the dark line correction device in accordance with this invention. As shown in the figure, the dark line correction device comprises a scanner 10, a base scan data calculation unit 20, a reference scan data calculation unit 30, a defect level unit 40, a defect-marking unit 50 and a correcting unit 60. Also, numeral 11 denotes a calibration paper and numeral 12 denotes a document to be scanned.

Before the document 12 is scanned, scanning the calibration paper 11 is performed first. The scanner 10 scans the calibration paper 11 to yield a calibrated output of the scanned image and sends the calibrated output to the base scan data calculation unit 20. The base scan data calculation unit 20, in accordance with the calibrated output of the scanned image, calculates the base scan data corresponding to various pixel positions by the averaging scheme. The reference scan data calculation unit 30, in accordance with the obtained base scan data, calculates the reference scan data corresponding to the pixel positions of the scanning line by the left-/right-reference algorithm or the curve approximation algorithm. Further, the defect level unit 40 yields a fixed or dynamic defect level for checking defect positions. Finally, the defect marking unit 50, in accordance with the base scan data, the reference scan data and the defect level, precisely determines the defect positions and the defective data channel of the primary colors on each defect position. The output is then provided to the correcting unit 60. The correction section 60 performs scanning data correction in accordance with the above defect information, and therefore, the object of this invention is achieved.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A device for correcting dark lines of a scanned image generated by an image scanner, comprising:

a base scan data calculation unit, coupled to the image scanner, for calculating a plurality of base scan data corresponding to positions of a typical scanning line in accordance with a calibrated output generated by the image scanner scanning a reference document;

a reference scan data calculation unit, coupled to the base scan data calculation unit, for calculating a plurality of reference scan data corresponding to the positions of the typical scanning line in accordance with the base scan data provided by said base scan computation section and a numerical processing procedure;

a defect level unit for providing a defect level;

a defect marking unit, coupled to the base scan data calculation unit, the reference scan data calculation unit and the defect level unit, for marking a defect position on the positions of the typical scanning line comparing the difference between the base scan data and the reference scan data with the defect level; and a correction unit, coupled to the image scanner and the defect marking unit, for correcting the scanned image according to the defect position to eliminate dark lines.

2. The device as recited in claim 1, wherein the scanned image generated by the image scanner includes three data channels corresponding to three primary colors.

3. The device as recited in claim 1, wherein the reference document is a white calibration paper.

4. The device as recited in claim 1, wherein the base scan data calculation unit calculates the base scan data corresponding to each position of the typical scanning lines by averaging the scan data in the same position produced by scanning the reference document.

5. The device as recited in claim 1, wherein the numerical processing procedure adopted in the reference scan data calculation unit yields the reference scan data by moving the base scan data right to a predetermined position.

6. The device as recited in claim 1, wherein the numerical processing procedure adopted in the reference scan data calculation unit yields the reference scan data by moving the base scan data left to a predetermined position.

7. The device as recited in claim 1, wherein the numerical processing procedure adopted in the reference scan data calculation unit yields the reference scan data corresponding to the positions of the typical scanning line by generating an approximate curve to the base scan data.

8. The device as recited in claim 7, wherein the approximate curve is obtained by segmenting the base scan data into a plurality of blocks, generating partial approximate curves of the blocks and merging the partial approximate curves into the approximate curve.

9. The device as recited in claim 1, wherein the defect level provided by the defect level unit is fixed.

10. The device as recited in claim 1, wherein the defect level unit is coupled to the reference scan data calculation unit and the base scan data calculation unit, and dynamically generates the defect level according to the reference scan data and the base scan data.

11. The device as recited in claim 1, wherein the correction unit correct the scan of the scanned image corresponding to the defect position using the scan data of the defect position and the scan data adjacent to the defect position.

12. A method for correcting dark lines of a scanned image generated by an image scanner, comprising the steps of:

driving the image scanner to scan a reference document and to generated a calibrated output;

calculating a plurality of base scan data corresponding to positions of a typical scanning line according to the calibrated output;

calculating a plurality of reference scan data corresponding to the positions of the typical scanning line according to the base scan data by using a numerical processing procedure;

providing a defect level;

marking a defect position on the positions of the typical scanning line by comparing the difference between the base scan data and the reference scan data with the defect level; and correcting the scanned image of the image scanner to eliminate dark lines according to the defect position.

13. The method as recited in claim 12, wherein the scanned image generated by the image scanner includes three data channels corresponding to three primary colors.

14. The method as recited in claim 12, wherein the reference document is a white calibration paper.

15. The device as recited in claim 12, wherein the base scan data calculation unit calculates the base scan data corresponding to each position of the typical scanning lines by averaging the scan data in the same position produced by scanning the reference document.

16. The method as recited in claim 12, wherein the numerical processing procedure yields the reference scan data by moving the base scan data right to a predetermined position.

17. The method as recited in claim 12, wherein the numerical processing procedure yields the reference scan data by moving the base scan data left to a predetermined position.

18. The method as recited in claim 12, wherein the numerical processing procedure yields the reference scan data corresponding to the position of the typical scanning line by generating an approximate curve to the base scan data.

19. The method as recited in claim 18, wherein the approximate curve is obtained by segmenting the base scan data into a plurality of blocks, generating partial approximate curves of the blocks and merging the partial approximate curves into the approximate curve.

20. The method as recited in claim 12, wherein the defect level is fixed.

21. The method as recited in claim 12, wherein the defect level is dynamically yielded based upon the reference scan data and the base scan data.

22. The device as recited in claim 12, wherein the correction unit corrects the scan data of the scanned image corresponding to the defect position using the scan data of the defect position and the scan data adjacent to the defect position.

* * * * *